Patented Apr. 6, 1954

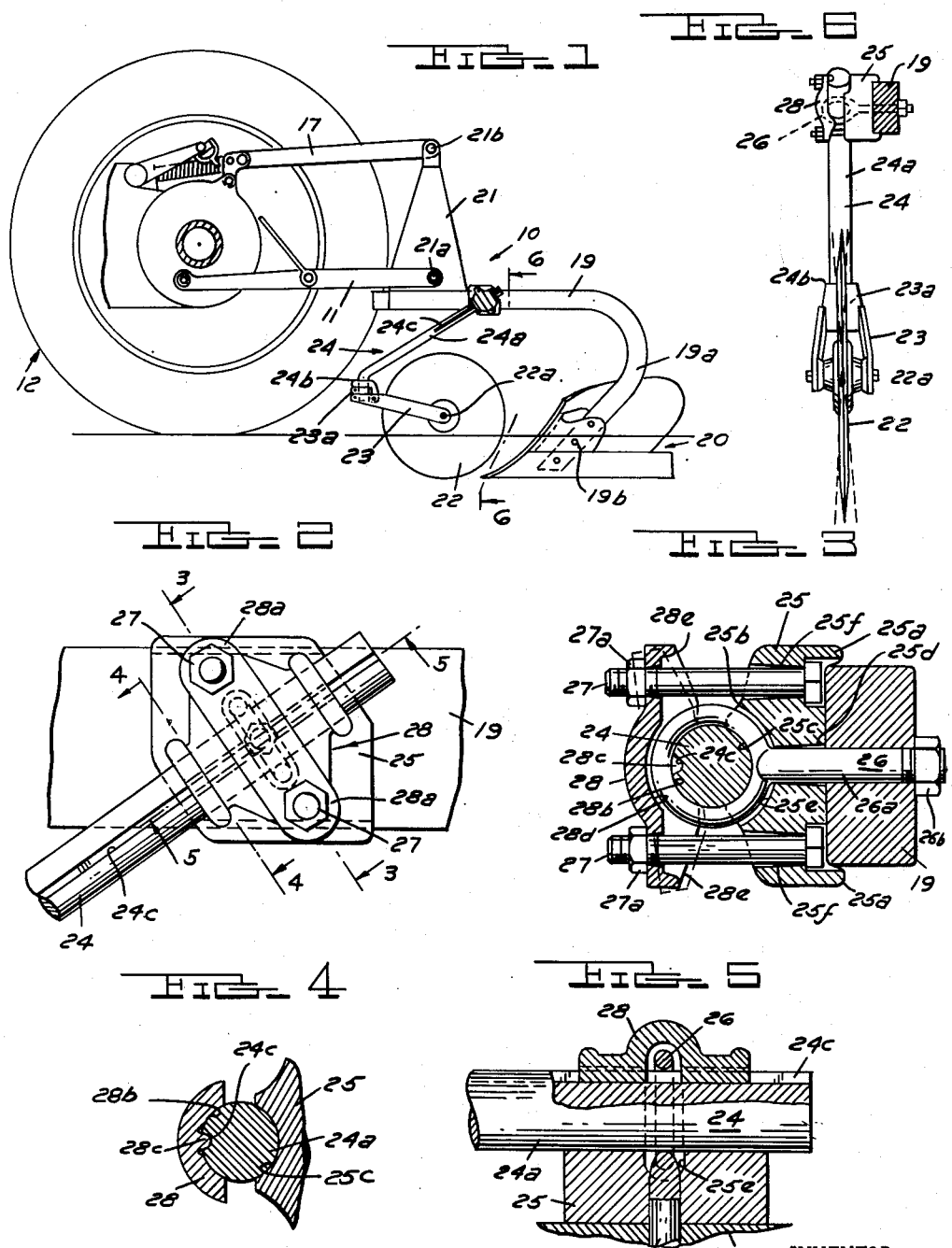

2,674,174

UNITED STATES PATENT OFFICE 2,674,174

COULTER MOUNTING

Rudolph J. Altgelt, South Bend, Ind., assignor, by mesne assignments, to Ford Motor Company, Dearborn, Mich., a corporation of Delaware Application August 13, 1951, Serial No. 241,559

1 Claim. (Cl. 97—198.1)

This invention relates to an improved rolling coulter mounting for moldboard plows.

The rolling coulter utilized with moldboard plows has a useful function in that it severs trash ahead of the plow bottoms so that such trash may be readily covered by overturned furrow slice. The coulters slicing through the earth also define the furrow wall which makes it easier for the plow bottom to turn the furrow slice and aids appreciably in reducing the tractor draft.

In some soils it is difficult to obtain a smooth, firm furow wall because the soil structure is such that it readily crumbles. When such occurs, the usual practice is to move the coulter farther away from the plow in a landside direction to overcome this condition. Unfortunately, however, the draft on the tractor is increased because of the wider furrow slice turned when the coulter is so adjusted. However, both of these problems can be overcome if the coulter can be adjusted to cut a sloping furrow wall.

The positioning of the coulter relative to the plow bottom is also important as such has a bearing on the penetration of the plow. For example, in hard ground the coulter should be positioned longitudinally quite near to the plow bottom but elevated considerably with respect to the plow share. In trashy, soft ground the coulter should be moved forwardly of the plow bottom but lowered close to the bottom line of the plow share to more readily sever trash.

In addition to these desirable ends, it is important that the support for the coulter be easily adjusted yet positively lock the coulter shank in a desired position of adjustment. As obstructions in the soil are constantly being encountered, it will be appreciated that the problem of providing a coulter support to conveniently permit such adjustments, yet resist the shocks transmitted to it without loosening the coulter, is a difficult one to solve.

It is, therefore, an object of this invention to provide an improved rolling coulter support for a moldboard plow which provides a plurality of convenient adjustments for optimum positioning of the coulter relative to the plow base to suit varying ground conditions.

Another object of this invention is to provide an improved rolling coulter mounting for moldboard plows which permits adjustment of the coulter to slope the furrow wall to overcome crumbling of the furrow wall with no appreciable increase in draft of the tractor.

A further object of this invention is to provide an improved rolling coulter mounting which provides for a plurality of convenient adjustments of the coulter shank and which will positively hold its adjustment.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a side elevational view of the rear end portion of a well-known tractor with a plow attached thereto and showing the improved coulter mounting secured to the plow beam.

Figure 2 is an enlarged detail side elevational view of the coulter mounting bracket.

Figure 3 is a cross sectional view taken along the plane 3—3 of Figure 2.

Figure 4 is a cross sectional view taken along the plane 4—4 of Figure 2.

Figure 5 is a longitudinal sectional view taken along the plane 5—5 of Figure 2.

Figure 6 is an enlarged fragmentary sectional view taken along the plane 6—6 of Figure 1 illustrating the coulter in various canted positions.

As shown on the drawings:

In Figure 1 there is shown a plow 10 mounted on the trailing hitch links 11 of a tractor 12 of well-known make. Plow 10 comprises the usual plow beam 19 which has a depending portion 19a on which there is secured, by a plurality of bolts 19b, a plow bottom 20. A plate-like upstanding A-frame 21 is secured to the forward end of plow beam 19 and such A-frame has a transverse cross shaft (not shown) respectively provided on its ends with a pair of oppositely disposed mounting pins 21a (only one of which is shown) on which are respectively mounted the trailing ends of hitch links 11. A top link 17 pivotally connected at its forward end to tractor 12 has its rear end pivotally secured by a transverse pin 21b between the upper transversely spaced apart ends of A-frame 21. Thus plow 10 is closely coupled to tractor 12 which facilitates its handling in the field. Further description of the plow 10, however, is believed unnecessary as such forms no part of this invention but is included to illustrate the application of the improved rolling coulter mounting to be now described.

A rolling coulter 22 is mounted on plow beam 19 ahead of plow bottom 20, as best shown in Figure 1. Coulter 22 is mounted within the usual coulter fork 23 and is rotatably secured thereto by a transverse axle 22a. A crank 24 is provided for swivelly mounting coulter fork 23 thereon. Crank 24 has an upwardly and rearwardly sloping shank portion 24a and an integral vertically depending portion 24b. On the forward end of coulter fork 23, there is provided the usual bracket 23a of conventional construction which permits pivotal mounting of fork 23 on the depending vertical portion 24b of crank 24. A longitudinally disposed groove 24c is provided on the upper end of the sloped shank portion 24a of crank 24 for a purpose to be later described.

A bracket 25 is provided to secure crank 24 to plow beam 19. Bracket 25 is a generally rectangularly shaped member and such bracket has a pair of edge flanges 25a respectively provided on its top and bottom edges as best shown in Figure 3. The edge flanges 25a snugly lap over the corresponding edges of plow beam 19 as best shown in Figure 3. Bracket 25 has a central raised portion 25b which is diagonally disposed and a substantially semi-cylindrical groove 25c is provided in the raised central portion 25b to receive the sloped shank portion 24a of crank 24 as will be presently described. A central aperture 25d is provided in bracket 25 through which is inserted the shank portion 26a of an eye bolt 26. The shank 26a of the eye bolt 26 is also inserted through a suitable transverse hole in plow beam 19 and a nut 26b screwed onto the threaded end of the eye bolt shank secures such eye bolt and bracket 25 to plow beam 19. A substantially semi-annular groove 25e in bracket 25, intersecting the central aperture 25d, receives the circular portion of the eye bolt 26 adjacent the shank portion. A pair of apertures 25f are respectively provided in the bracket 25 through which there are respectively inserted a pair of bolts 27 utilized to secure a clamp 28, to be presently described, to bracket 25. The holes 25f are counterbored at their bolt entering ends to receive the head portions of bolts 27. The bolt exit ends of holes 25f are enlarged somewhat for a purpose to be later described.

The sloped shank portion 24a of crank 24 rests within the semi-cylindrical groove 25c of bracket 25, as mentioned, and crank 24 is adjustably secured to such bracket by clamp 28. Clamp 28 has a pair of oppositely disposed lugs 28a which are apertured to respectively receive the ends of bolts 27. A semi-cylindrical groove 28b is provided in clamp 28 to conveniently permit such clamp to surround the outer half of crank 24. Clamp 28 has an integral longitudinal rib 28c within semi-cylindrical groove 28b which cooperates with the longitudinal groove 24c in crank 24 to effectively prevent rotation of such crank. Clamp 28 also has a semi-annular groove 28d to accommodate the other half of the eye portion of eye bolt 26. The inner faces of clamp 28, adjacent the semi-cylindrical groove 28b, are sloped outwardly, as shown at 28e, to provide clearance so that clamp 28 may be rocked or shifted to obtain limited rotation of crank 24 as will be explained. A pair of nuts 27a respectively screwed onto the threaded ends of bolts 27 tighten clamp 28 against crank 24 to secure crank 24 to bracket 25 in a selected position of adjustment. The rolling coulter 22 may be conveniently vertically adjusted by simply loosening nuts 27a and also eye bolt nut 26b and sliding crank 24 within bracket 25 until the desired height of coulter 22 is obtained whereupon nuts 27a and nut 26b of eye bolt 26 are tightened.

In the event that the furrow wall formed by the plow coulter tends to crumble, the crank 24 is rotated to cant coulter 22 by simply loosening nuts 27a and 26b of bolts 27 and eye bolt 26 respectively, whereupon crank 24 may be rotated slightly so that coulter 22 will be canted from its vertical position as shown in dotted outline in Figure 6. It will be noted that the sloped surfaces 28e on clamp 28 permit shifting or rocking of clamp 28 in order to rotate crank 24 to obtain the desired setting of coulter 22. Hence, the furrow wall produced by coulter 22 will be sloped inwardly, thereby substantially overcoming crumbling of the furrow wall without adding appreciably to the draft of the tractor. Furthermore, by linearly sliding the coulter shank portion 24a within bracket 25, the coulter may be simultaneously vertically as well as longitudinally adjusted relative to the plow bottom to suit the soil condition in which the plow is working.

From the foregoing description, it is thus apparent that there is here provided an improved coulter mounting which permits the rigid securing of the coulter to the plow beam but also provides for a greater range and variety of adjustments. In addition, this improved coulter mounting provides for tilting of the coulter to obtain a sloped furrow wall. Not only is this improved coulter mounting of relatively simple design and hence economical to manufacture, but this construction will positively hold the coulter in any selected position of adjustment.

It will, of course, be understood that various details of construction may be varied through a wide range without departing from the principles of this invention and it is, therefore, not the purpose to limit the patent granted hereon otherwise than necessitated by the scope of the appended claim.

I claim:

For use with a moldboard plow having a beam, a support for a rolling coulter comprising a bracket adapted for mounting on the beam, said bracket having a semi-cylindrical groove, an eye bolt having a shank portion traversing said bracket and beam to secure said bracket to said beam, the eye portion of said eye bolt being aligned with said groove, a cylindrical standard having a longitudinal groove, said standard being inserted through said eye bolt and disposed in said semi-cylindrical groove, a pair of bolts loosely projecting transversely through said bracket thereby permitting substantial end movement of said bolts, a clamp member constructed and arranged to partially surround said standard and defining a semi-annular groove to receive the outermost portions of said eye bolt, said clamp member having a pair of apertures to respectively loosely receive said pair of bolts, and a rib on said clamp member engageable with said longitudinal groove of said standard, said end movement of said bolts permitting rocking of said clamp member to rotate said standard to a desired angular position, and nuts on said bolts for locking said clamp member in any selected position of adjustment when tightened.

References Cited in the file of this patent

UNITED STATES PATENTS

| Number | Name | Date |
|---|---|---|
| 1,097,299 | Carlson | May 19, 1914 |
| 1,192,155 | Baker | July 25, 1916 |
| 1,410,084 | Viar | Mar. 21, 1922 |
| 1,790,956 | Strandlund | Feb. 3, 1931 |